(12) United States Patent
Oleary

(10) Patent No.: US 11,084,310 B2
(45) Date of Patent: Aug. 10, 2021

(54) APPLIQUÉ TO PROVIDE A DESIGN ON A FABRIC

(71) Applicant: ITW IRELAND, County Cork (IE)

(72) Inventor: Caroline Oleary, County Cork (IE)

(73) Assignee: ITW IRELAND, County Cork (IE)

( * ) Notice: Subject to any disclaimer, the term of this patent is extended or adjusted under 35 U.S.C. 154(b) by 0 days.

(21) Appl. No.: 16/010,978

(22) Filed: Jun. 18, 2018

(65) Prior Publication Data

US 2018/0371690 A1   Dec. 27, 2018

Related U.S. Application Data

(63) Continuation of application No. 14/605,352, filed on Jan. 26, 2015, now Pat. No. 10,000,888, which is a
(Continued)

(30) Foreign Application Priority Data

Apr. 1, 2009 (IE) .................................... 2009/0255

(51) Int. Cl.
*B32B 27/08* (2006.01)
*B41M 5/52* (2006.01)
*B41M 5/50* (2006.01)

(52) U.S. Cl.
CPC ........... *B41M 5/5218* (2013.01); *B32B 27/08* (2013.01); *B41M 5/506* (2013.01); *B41M 5/508* (2013.01);
(Continued)

(58) Field of Classification Search
CPC ..... Y10T 428/24851; Y10T 428/24893; Y10T 428/249982; Y10T 428/25; Y10T 428/31551
(Continued)

(56) References Cited

U.S. PATENT DOCUMENTS 5,916,399 A    6/1999  Olsen
6,264,855 B1 * 7/2001  Kitagawa ........... C09K 11/7703
                                           252/301.4 P
(Continued)

FOREIGN PATENT DOCUMENTS

CN     1280110 A   8/2004
CN     2803767 Y   8/2006
(Continued)

OTHER PUBLICATIONS

International Search Report and Written Opinion from PCT Patent Application No. PCT/IE2010/000018 dated Jan. 31, 2011.
(Continued)

*Primary Examiner* — Betelhem Shewareged
(74) *Attorney, Agent, or Firm* — Pilloff Passino & Cosenza LLP; Martin J. Cosenza

(57) ABSTRACT

An appliqué of the invention comprises a disposable carrier film onto which a release layer and PU inks are printed using layering techniques. The ink layers can be multicoloured and each colour is applied sequentially using a conventional screen-printing method. A back-up, a lacquer layer, and an adhesive layer are printed in sequence over the ink layers. The ink includes reflective particles providing the optical effect of a 3-dimensional appliqué. The artwork is created by overlapping design layers to controlled specification sequences. The ink, because of the additives, creates a desired colour tone, and this may be enhanced by layering of the ink in an overlapping region. Thus, there are three main regions, namely a central region with reflective ink, a "shoulder" region with overlapping matt and reflective inks and an outer region with only matt ink.

19 Claims, 3 Drawing Sheets

1. Adhesive Dispersion
2. Lacquer
3. Back Up
4. PU + Additive Particles
5. PU Ink
6. Release Adhesive
7. Disposable Carrier

Related U.S. Application Data continuation of application No. 13/262,581, filed as application No. PCT/IE2010/000018 on Apr. 1, 2010, now Pat. No. 8,940,387.

(52) U.S. Cl.
CPC ........ *B41M 5/52* (2013.01); *Y10T 428/24802* (2015.01); *Y10T 428/24851* (2015.01)

(58) Field of Classification Search
USPC ...................................... 428/195.1
See application file for complete search history.

(56) References Cited

U.S. PATENT DOCUMENTS

| | | | |
|---|---|---|---|
| 6,749,996 B2 | 6/2004 | Roberts et al. | |
| 7,799,164 B2 | 9/2010 | Abrams | |
| 7,811,669 B2* | 10/2010 | Fujii | C23C 14/0021 427/255.18 |
| 2001/0042945 A1* | 11/2001 | Wu | B29C 35/12 264/480 |
| 2009/0241234 A1* | 10/2009 | Coles | A41D 13/01 2/69 |
| 2010/0095571 A1* | 4/2010 | James | A41D 27/08 40/586 |
| 2010/0220388 A1* | 9/2010 | Suzuki | B32B 17/10633 359/359 |
| 2012/0141698 A1* | 6/2012 | OLeary | D06P 5/003 428/32.77 |
| 2018/0371690 A1* | 12/2018 | OLeary | D06P 5/003 |

FOREIGN PATENT DOCUMENTS

| | | |
|---|---|---|
| CN | 101263002 A | 9/2008 |
| JP | S6297898 A | 5/1987 |
| WO | 2007016341 A1 | 2/2007 |

OTHER PUBLICATIONS

International Search Report issued in PCT/US2017/050425 dated Nov. 6, 2017.

* cited by examiner

1. Adhesive Dispersion
2. Lacquer
3. Back Up
4. PU + Additive Particles
5. PU Ink
6. Release Adhesive
7. Disposable Carrier F. Fabric
5. PU Ink
4. PU Ink + Additive Particles
3. PU InkBack Up
2. Lacquer
1. Adhesive Dispersion 4. PU Ink + Additive Particles
5. PU Ink
8. Layered '3D' Effect 34. 3 Dimensional Insert
31. Adhesive Dispersion
32. Lacquer
33. Backer
35. PU Ink
36. Release Adhesive
37. Disposable Carrier 35. PU Ink
33. Back Up
32. Lacquer
31. Adhesive Dispersion
34. 3-Dimensional Insert
F. Fabric 48. Adhesive Dispersion
44. Flock Fibre
41. Adhesive
42. Lacquer
43. Back Up
45. PU Ink
46. Release Adhesive
47. Disposable Carrier 44. Flock Fibre
48. Flock Adhesive
45. PU Ink
43. Back Up
42. Lacquer
41. Adhesive Dispersion
F. Fabric

APPLIQUÉ TO PROVIDE A DESIGN ON A FABRIC

The present application is a Continuation application of U.S. application Ser. No. 14/605,352, filed Jan. 26, 2015, which is a Continuation application of U.S. application Ser. No. 13/262,581, filed Feb. 23, 2012, now U.S. Pat. No. 8,940,387, which is a National Stage of PCT/IE2010/000018, filed Apr. 1, 2010, which claims priority from Ireland Application No. 2009/0255, filed Apr. 1, 2009, the entire contents of each application being incorporated herein by reference in their entirety.

INTRODUCTION

The invention relates to application of designs to textiles or fabric, for example a garment such as a sports shirt.

In this specification, the term "appliqué" means a decorative patch or badge, which is applied to a fabric to impart a decorative design such as a logo on the fabric such as a garment.

The invention is directed towards providing an appliqué having a "3D" effect, with minimum impact on manufacturing complexity.

SUMMARY OF THE INVENTION

According to the invention, there is provided an appliqué for applying a design to a fabric, the appliqué comprising:
  at least one ink layer printed on a substrate; and
  an application adhesive suitable for adhering the appliqué to a fabric,
  wherein the appliqué is adapted to provide a three-dimensional visual effect.

In one embodiment, at least one ink layer incorporates an additive to provide a three-dimensional visual effect in combination with other parts of the appliqué.

In one embodiment, the additive comprises reflective particles.

In one embodiment, the reflective particles are coated in titanium dioxide or iron oxide.

In one embodiment, the additive comprises an agent which expands, such as with application of heat.

In one embodiment, the agent is a blowing agent.

In one embodiment, there are multiple layers of ink at least two of which only partly overlap.

In one embodiment, a layer includes an additive such as reflective particles or blowing agent and at least one other layer does not include an additive.

In one embodiment, the substrate is non-planar.

In one embodiment, the appliqué further comprises an insert of a material such as fabric or foil to provide a surface profile.

In one embodiment, the insert bridges stacks of layers including the ink and the substrate.

In one embodiment, the stacks include an upper disposable carrier, a release adhesive layer, an ink layer, and an opaque backer layer which is bonded to a lacquer layer.

In one embodiment, the insert is secured to the stack on each side by adhesive in a manner whereby it is free-floating within the appliqué.

In one embodiment, an ink is printed alongside a flock on a substrate in a desired pattern.

In one embodiment, the surfaces of the ink and of the flock are at different levels.

In one embodiment, the flock fibres are reinforced with a permanent thermosetting adhesive layer.

In one embodiment, the appliqué comprises an upper disposable carrier and a release adhesive layer.

In one embodiment, the carrier is of polyester material.

In one embodiment, the ink is between a release adhesive layer and a backer layer.

In one embodiment, at least one ink is a polyurethane ink.

In one embodiment, the backer layer is positioned between an ink layer and a lacquer layer.

In one embodiment, the backer layer comprises a polyurethane-based ink

In one embodiment, the backer layer comprises a single polyurethane ink layer or multiple polyurethane ink layers.

In one embodiment, a lacquer layer is positioned between a backer layer and an adhesive layer.

In one embodiment, the lacquer layer allows the appliqué to stretch when the appliqué is applied to a fabric.

In one embodiment, the appliqué comprises an adhesive layer comprising a hotmelt powder.

In one embodiment, the appliqué comprises an adhesive layer comprising an activated permanent thermosetting compound.

In one embodiment, the appliqué comprises an adhesive layer comprising a migration-resistant blocking agent.

In another aspect, the invention provides a garment or piece of fabric comprising any appliqué as defined above adhered thereto.

In a further aspect, the invention provides a method of decorating a fabric comprising the steps of applying any appliqué as defined above to the fabric.

In a further aspect, the invention provides a method of manufacturing any appliqué as defined above comprising the steps of depositing the ink on the substrate in a manner to provide a three-dimensional effect.

In one embodiment, the method comprises the step of blending the ink with an additive to achieve a desired visual effect.

In one embodiment, the additive includes reflective particles.

In one embodiment, the additive includes a blowing agent or any other agent which expands to increase height of the ink.

In one embodiment, the method comprises the step of overlapping ink layers in a pattern chosen according to a desired three-dimensional visual effect.

In one embodiment, the method comprises the step of depositing an ink to a greater depth than another ink on the substrate.

In one embodiment, the inks are deposited with different screen-printing stencils.

In one embodiment, the inks have different viscosities.

In one embodiment, an insert is retained within the appliqué.

In one embodiment, the insert bridges stacks of layers on either side in a manner whereby the insert has the effect of floating.

In one embodiment, at least some of the ink is deposited alongside flock in a desired pattern on the substrate.

DETAILED DESCRIPTION OF THE INVENTION

The invention will be more clearly understood from the following description of some embodiments thereof, given by way of example only with reference to the accompanying drawings in which:—

The invention provides an appliqué which gives a 3D visual effect. This is achieved by way of ink layering techniques and/or incorporation of additives such as reflective particles in an ink and/or non-planar configuration of a substrate and/or incorporation of a textile insert to provide physically different depths, and/or deposition of ink and flock of different or similar depths alongside each other in a pattern.

Figure 1:
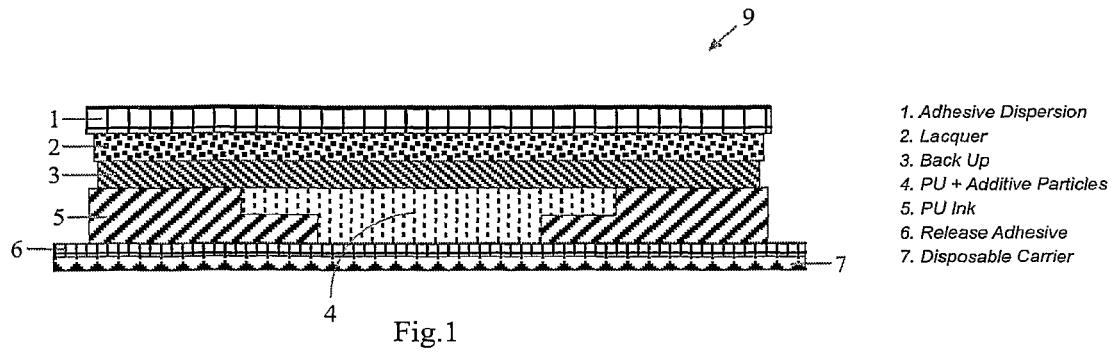
FIG. 1 is a cross-sectional view of an appliqué of the invention for application of a design to a garment.
Figure 2:
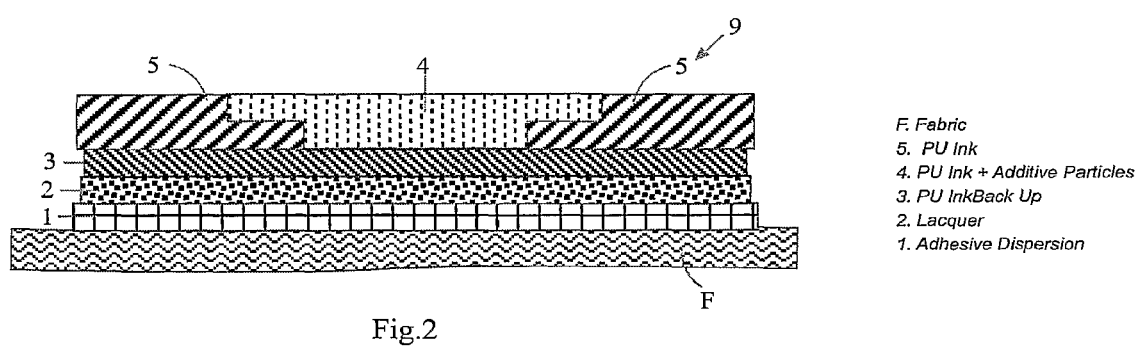
FIG. 2 is a cross-sectional view of the appliqué after application onto textile fabric (F)
Figure 3:
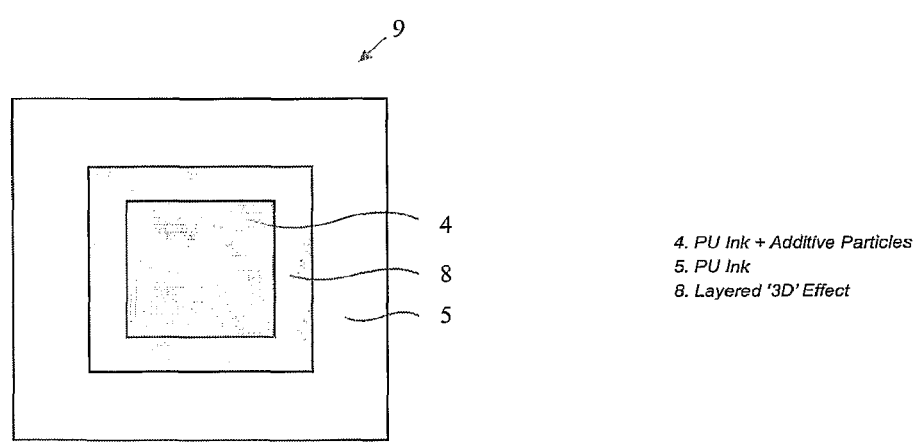
FIG. 3 is a plan view of the appliqué.

Referring to FIGS. 1 to 3, an appliqué 9 of the invention comprises a disposable carrier film 7 onto which a release layer 6 and PU inks 5 and 4 are printed using layering techniques. The ink layers 4 and 5 can be multicoloured and each colour is applied sequentially using a conventional screen-printing method. A back-up 3, a lacquer layer 2, and an adhesive layer 1 are printed in sequence over the ink layers.

The ink 4 includes additives, in this embodiment, reflective particles. These aspects provide the optical effect of a 3-dimensional appliqué. The artwork is created by overlapping design layers to controlled specification sequences. The ink 4, because of the additives, creates a desired colour tone, and this may be enhanced by layering of the inks as illustrated in the overlapping region 8. Thus, as viewed in FIG. 3, there are three main regions, namely:

a central region with reflective ink 4,
a "shoulder" region with overlapping matt and reflective inks 4 and 5, and
an outer region with only matt ink 5.

The ink 4, being blended with light reflecting particles, has a bright, sparkly shimmer, with a degree of light scattering behaviour. The light scattering ability of the additive is dependent directly on the concentration of additive blended into the ink. Blends with higher amounts of the additive will scatter more light than those with lower amounts of additive. Polyurethane ink has a low light scattering ability. Therefore the ink 5 has a matt appearance and contrast between the matt ink 5 and the reflective ink 4 intensifies the optical 3-dimensional effect.

The adhesive 1 comprises an adhesive system made from adhesive combined with hotmelt adhesive powder. The adhesive can include one or more of (but not limited to) acrylic; epoxide; polyamide; polyester, polyolefin; polyurethane; and polyurethane ester adhesives. For example, the adhesive TO485 polyurethane adhesive can be used.

To apply a design to a textile, the appliqué 9 is simply placed on the textile with the disposable carrier face up 7, with the adhesive layer 1 in contact with the textile. Heat and pressure are applied so the adhesive 1 impregnates into the fabric (F) to seal the appliqué in place.

The invention has the major advantage of optically creating a 3-dimensional effect even there is minimal impact on the manufacturing process. Also, the appliqué is very simple to apply with heat and pressure, in a conventional manner.

Figure 4:
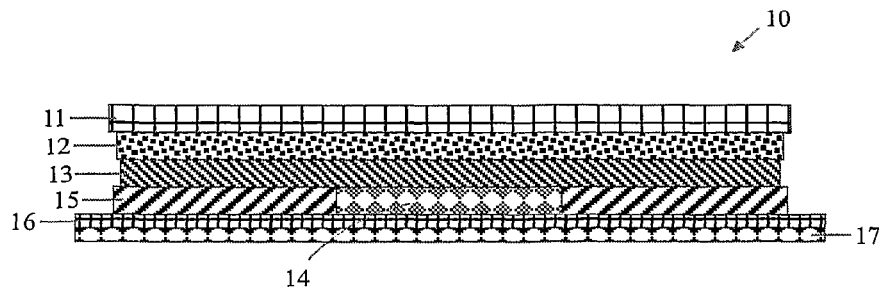
FIGS. 4 and 5 are cross-sectional views of an appliqué before and after application to a fabric, the appliqué having a PU ink incorporating a blowing agent to give a 3D effect.
Figure 5:
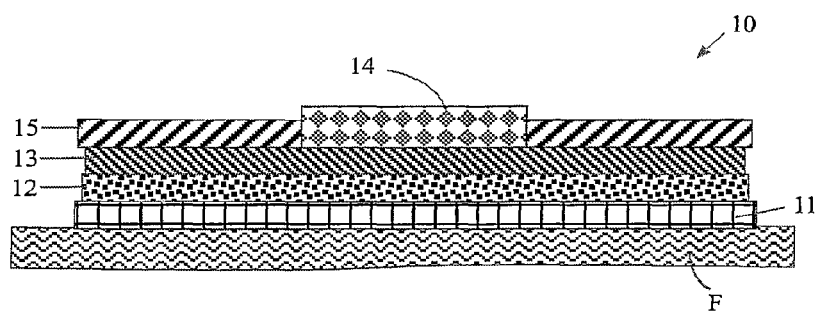

Referring to FIG. 4 and FIG. 5, in another embodiment, an appliqué 10 has a physical 3-dimensional effect by printing PU inks 15 alongside inks 14 blended with additives which give varying heights to appliqué (best illustrated in FIG. 5). The additives in the ink 14 are chemically formulated blowing agents, and control of composition proportions allows excellent control of the ink thickness. The blowing agents are activated with heat upon application to expand from the depth shown in FIG. 4 to that shown in FIG. 5.

Figure 6:
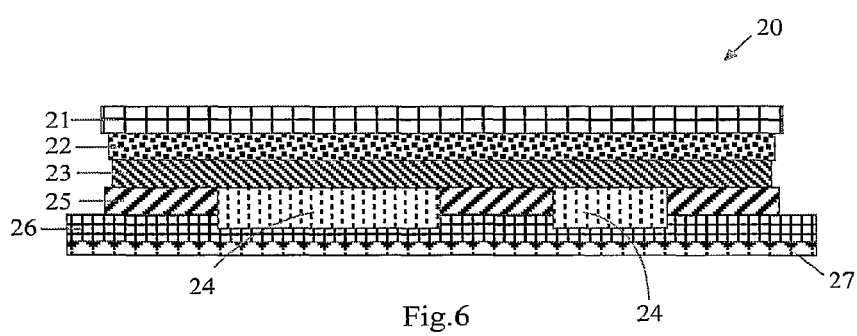
FIGS. 6 and 7 are cross-sectional views of an appliqué before and after application to a fabric, the appliqué having PU ink raised in a screen-printed pattern to provide a 3D effect.
Figure 7:
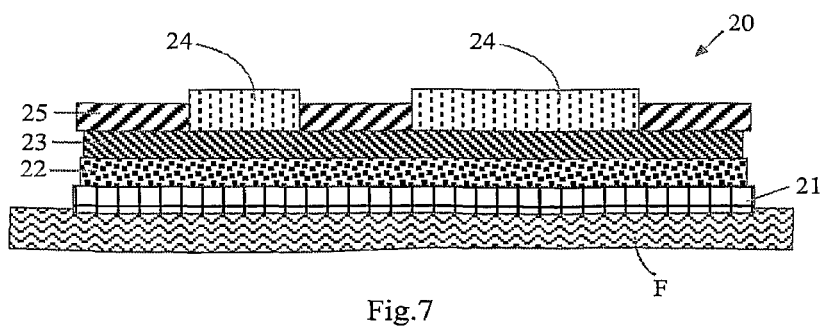

Referring to FIG. 6 and FIG. 7, in another embodiment, an appliqué 20 provides a physical 3-dimensional effect by printing inks 24 and 25 of varying thicknesses onto a disposable carrier 27. Thus, there is flat polyurethane ink and raised inks. The invention has the major advantage of incorporating different depth of deposit, which is visually noticeable. The raised ink 24 is raised because of the use of thick stencil screen technology and PU ink of a higher viscosity to achieve the greater height. Also, the appliqué is easy to apply to fabric (F) using heat and pressure in a conventional manner. The surface of the appliqué can be textured. Again, the appliqué 20 has a backer layer 23, a lacquer layer 22, and an adhesive dispersion 21.

Figure 8:
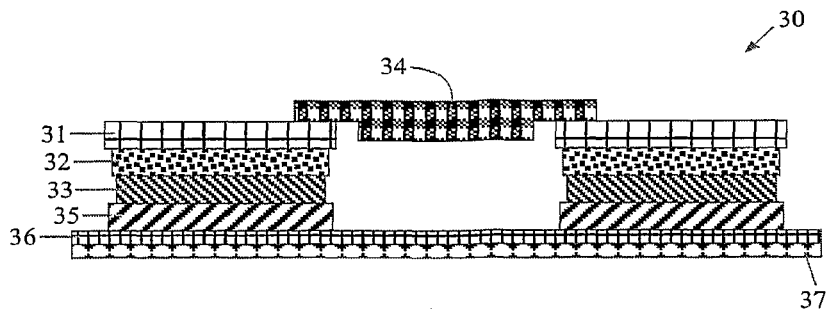
FIGS. 8 and 9 are cross-sectional views of an appliqué before and after application to a fabric, the appliqué having a 3D textile insert.
Figure 9:
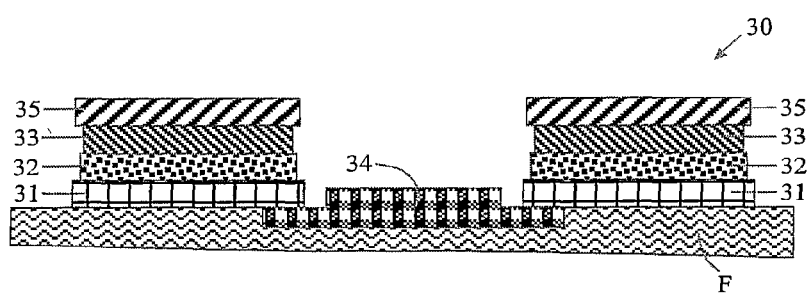

Referring to FIG. 8 and FIG. 9, in another embodiment, an appliqué 30 provides a physical 3-dimensional effect by including in an appliqué a laser or die-cut motif; textile insert 34 between stacks of PU ink 35, backer 33, lacquer 32, and adhesive dispersion 31. The insert is applied so that the appliqué can be heat-applied in an easy one-step operation.

The insert may alternatively be of foil, flock, natural or synthetic materials including textiles, film or hologram for example. The physical configuration is achieved by leaving an open area for the insert to show through. The insert is cut smaller than the total design area so that some adhesive remains outside the insert area for application.

The adhesive 21 is a hot-melt adhesive comprises a thermoplastic film made from aromatic or aliphatic thermoplastic. The hot-melt film can include one or more of; (but not limited to) polyamide; polyester; polyolefin; polyurethane; and polyurethane ester. For example, the hot-melt film can be 76 µm Bemis Polyester Hotmelt Film 5214.

Figure 10:
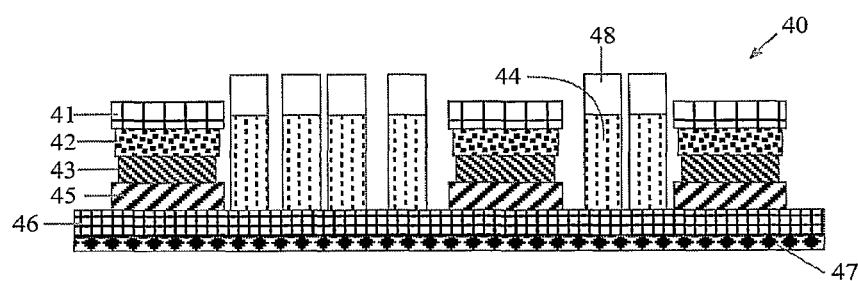
FIGS. 10 and 11 are cross-sectional views of an appliqué before and after application to a fabric, the appliqué having flock alongside PU ink on a single substrate to provide a 3D effect.
Figure 11:
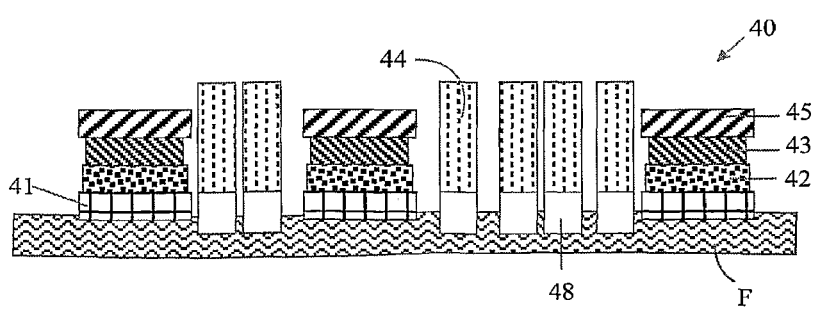

Referring to FIGS. 10 and 11, in another embodiment, in an appliqué 40 a physical 3-dimensional effect is achieved by printing multiple colours of flat PU inks 45 and multiple flocks 44 onto the same disposable carrier 47. The PU inks 45 and backer, lacquer, and adhesive layers 43, 42 and 41 are printed onto the disposable carrier 47 in the areas where PU ink is desired. Areas of the design where flock 44 is required are left void on the carrier during PU ink printing. These areas are then electrostatically flocked in the desired pattern and the flock adhesive 48 is printed last. The appliqué 40 is easy to apply to fabric (F) using heat and pressure. The surface of the appliqué has a visible height difference between the flat PU ink 45 and the raised flock fibres 44.

This embodiment has the major advantage of creating a combination print where richly textured pile gives a plush hand feel alongside the smooth flat surface of polyurethane inks. Thus, the invention makes use of combining polymer appliqué technology with flock printing techniques. This combines, for example, the use of lightweight, sports-performance polyurethane appliqué materials with flock printing technology directly onto the carrier to create a polyurethane-flock combined appliqué. The flock can be any electrostatically chargeable fibre, such as fibres made from rayon, nylon, cotton, acrylic and polyester.

The Polyurethane adhesives 1, 11, 21, 31, and 41 referred to above are all of the cross-linking solvent-based polyurethane emulsion type or water-based polyurethane emulsion type, the particular cross-linking for each adhesive being chosen to suit the substrate. While alternatives are possible such as an acrylic-based adhesive for the release adhesive 46 (on disposable Polyester film 47), it is believed that polyurethane emulsions are more effective.

The flock adhesive 48 referred to above is of the cross-linking water-based acrylic emulsion type, the particular cross-linking for each adhesive being chosen to suit the substrate. Alternatives are possible such as a polyurethane-based adhesive.

The following summarizes advantageous features of the invention in various embodiments to achieve a 3-dimensional effect:

- Artwork layering techniques, ink formulations with additives such as light reflective particles, printing inks of varying thicknesses onto a carrier, and/or printing both flock alongside dink on the same carrier.
- A combination of a film-backed polyurethane heat transfer with a laser or die cut motif of fabric or other materials, where both are combined to allow them to be heat applied in an easy one step heat application operation. The combination of a PU appliqué with other materials creates a physical 3-dimensional effect.
- The ink incorporates blended mass-reducing particles, and/or fluorescent particles, and/or phosphorescent particles, and/or ultra violet particles or inks, and/or thermochromic particles, and/or photochromic particles, and/or electorchromic particles, and/or 'mirror' particles, and/or porous particles, and/or metallic particles, and/or solar charged particles, and/or kinetic charged particles, and/or magnetic particles, and/or chemical agents which undergo changes to structure and thickness at defined temperatures
- Inks of different thicknesses are printed on the same carrier to achieve different heights.
- The ink has added colour pigment and/or dyes.
- The ink may be fully transparent, or translucent, or opaque.
- The ink may be ultra violet activated, have elastic stretch and recovery characteristics, be compression resistant, be malleable, and/or have compression and recovery characteristics.
- It may incorporate fabric material, which may be sublimated with a pre-printed pattern, or may be in its natural state.
- The fabric material may be pre-dyed and or coated. Dyed fabric can include but not exclusively standard textile dyes but this can also include metallic coatings, fluorescent coatings/dyes, heathers and other surface treatment.
- An insert may be included and this may be a fabric which is a woven fibre including, plain, twill, crow's feet, basket or satin weave. These fabrics can be made of
    - Natural Fabrics: linen, silk, satin, denim, canvas, jute, velvet, cotton, wool, organza, brocades, felt, natural recycled fabrics, organic fabrics, hemp.
    - Synthetic Fabrics: polycotton, viscose, acetate, polyamide, organza, chiffon, sateen, lycra, spandex, lurex, taffeta, velour, polyester, acrylic, nylon, technical/composite fabrics, or recycled fabrics.
- The insert may be a flocked appliqué, or a film which can be coated and uncoated, or a metallic foil or an organometallic foil which can be coated and uncoated.
- The insert may be a motif, may have a holographic pattern, insert includes audio or visual digital components, include RF Id Tags components.
- Flock fibres, where included, can be pre dyed. The flock fibre can be any electro statically chargeable fibre, such as fibres made from rayon, cotton, nylon, acrylic and polyester. The flock fibres are of a high lustre type, and/or translucent, and/or of differing lengths, and/or of a pre-determined length, and/or contain an Ultra Violet coating
- Resin, where used, could encapsulate delicate fabrics or other materials.
- An application adhesive may be a polyurethane resin, or a hotmelt, or an acrylic co–polymer and a polyurethane resin.

The following are examples of the inks, adhesives and additives, which can be used in various embodiments.

Polyurethane Ink 4:
Product: Nylotex NX Series
Chemical Description: Polyurethane ink dispersion
Polyurethane Ink 5:
Product: Nylotex NX Series
Chemical Description: Polyurethane ink dispersion
Polyurethane Ink 14:
Product: Nylotex NX Series
Chemical Description: Polyurethane ink dispersion
Polyurethane Ink 15:
Product: Nylotex NX Series
Chemical Description: Polyurethane ink dispersion
Polyurethane Ink 24:
Product: Nylotex NX Series
Chemical Description: Polyurethane ink dispersion
Polyurethane Ink 25:
Product: Nylotex NX Series
Chemical Description: Polyurethane ink dispersion
Polyurethane Ink 35:
Product: Nylotex NX Series
Chemical Description: Polyurethane ink dispersion
Polyurethane Ink 45:
Product: Nylotex NX Series
Chemical Description: Polyurethane ink dispersion
Backer 3:
Product: Nylotex NX Series
Chemical Description: Polyurethane ink dispersion
Backer 13:
Product: Nylotex NX Series
Chemical Description: Polyurethane ink dispersion
Backer 23:
Product: Nylotex NX Series
Chemical Description: Polyurethane ink dispersion
Backer 33:
Product: Nylotex NX Series
Chemical Description: Polyurethane ink dispersion
Backer 43:
Product: Nylotex NX Series
Chemical Description: Polyurethane ink dispersion
Lacquer 2:
Product TO458
Chemical Description: Polyurethane adhesive dispersion
Lacquer 12:
Product: TO458
Chemical Description: Polyurethane adhesive dispersion
Lacquer 22:
Product: TO458
Chemical Description: Polyurethane adhesive dispersion Lacquer 32:
Product: TO458
Chemical Description: Polyurethane adhesive dispersion
Lacquer 42:
Product: TO458
Chemical Description: Polyurethane adhesive dispersion
Adhesive 1:
Product: D 1365 & TO458
Chemical Description: Co-polyester hotmelt adhesive powder dispersed in a Polyurethane adhesive dispersion
Adhesive 11:
Product: D 1365 & TO458
Chemical Description: Co-polyester hotmelt adhesive powder dispersed in a Polyurethane adhesive dispersion
Adhesive 21:
Product: D 1365 & TO458
Chemical Description: Co-polyester hotmelt adhesive powder dispersed in a Polyurethane adhesive dispersion
Adhesive 31:
Product: D 1365 & TO458
Chemical Description: Co-polyester hotmelt adhesive powder dispersed in a Polyurethane adhesive dispersion
Adhesive 41:
Product: D 1365 & TO458
Chemical Description: Co-polyester hotmelt adhesive powder dispersed in a Polyurethane adhesive dispersion
Adhesive 48:
Product: TUBTRANS BOND-3,
Chemical Description: Acrylic Co-Polymer in aqueous dispersion
Additive in ink 4:
Product: SIPI558 FM Pearl Glitter Speciality Effect,
Chemical Description: Mica platelets coated with various thicknesses of titanium dioxide or iron oxide.
Additive in ink 14:
Product: NUPUFF 10250NPF,
Chemical Description: Blowing agent dispersed in PU ink.
Polyurethane Ink Product: Nylotex NX Series
Supplier of above inks:
Fujifilm Sericol Limited
Pysons Road, Broadstairs, Kent. CT10 2LE, England.
Polyurethane Ink Backer Product: Nylotex NX Series
Supplier of above adhesives:
Fujifilm Sericol Limited,
Pysons Road, Broadstairs, Kent. CT10 2LE, England.
Lacquer Product: TO458
Supplier of above adhesives:
Fujifilm Sericol Limited,
Pysons Road, Broadstairs, Kent. CT10 2LE, England.
Adhesive Product: TO458
Supplier of above adhesives:
Fujifilm Sericol Limited,
Pysons Road, Broadstairs, Kent. CT10 2LE, England.
Adhesive Product: Tubitrans Bond 3
Supplier of above adhesives:
CHT R. BEITLICH GMBH,
Werk Oyten, Rudolf-Diesel-StraBe 19-21, D-28876 Oyten, Germany
Hotmelt Product:
Product: ADHESIVE HOTMELT NAME
Chemical Description: EMS-Griltech Griltex® D 1365E Copolyester Hotmelt Adhesive
Supplier of above adhesives: EMS-CHEMIE AG
Business Unit EMS-GRILTECH, Reichenauerstrasse, CH-7013 Domat, Switzerland.

Additive to ink 4: Product: SIPI558 FM Pearl Glitter Speciality Effect, Supplier of above additive: Nazdar Ltd., Barton Road Heaton, Mersey, Stockport, England, SK4 3EG
Additive Product to ink 14: NUPUFF 10250NPF,
Supplier of above additive: Nazdar Ltd., Barton Road Heaton, Mersey, Stockport, England, SK4 3EG The invention is not limited to the embodiments described but may be varied in construction and detail. For example, the appliqué could be applied to a fabric other than that of a garment.

The invention claimed is:

1. An apparatus, comprising:
a fabric; and
an insignia adhered to the fabric, wherein
the insignia provides a three-dimensional visual effect while adhered to the fabric,
the insignia includes at least one ink layer, which provides at least in part the three-dimensional visual effect, and
the insignia includes a first ink section and a second ink section, the second ink section having additive particles not present in the first ink section, the first and second ink sections provide at least in part the three-dimensional visual effect.

2. The apparatus of claim 1, wherein:
the insignia includes ink blended with additives that give varying heights to the insignia.

3. An apparatus, comprising:
a fabric; and
an insignia adhered to the fabric, wherein
the insignia provides a three-dimensional visual effect while adhered to the fabric,
the insignia includes at least one ink layer, which provides at least in part the three-dimensional visual effect, and
the insignia includes ink and flock fibres, wherein a visible difference in height exists between the ink and the fibres.

4. The apparatus of claim 3, wherein:
the insignia includes a PU ink raised in a screen-printed pattern to provide at least in part the three-dimensional visual effect.

5. The apparatus of claim 1, wherein:
the insignia includes an ink blended with light reflecting particles.

6. The apparatus of claim 3, wherein:
the apparatus is a shirt, and the fabric is part of the shirt.

7. The apparatus of claim 3, wherein:
the insignia includes inks printed onto the insignia that have varying thickness that provide at least in part the three-dimensional visual effect.

8. The apparatus of claim 3, wherein:
the insignia includes a first ink section and a second ink section, the second ink section having additive particles not present in the first ink section, the first and second ink sections provide at least in part the three-dimensional visual effect.

9. An apparatus, comprising:
a means for clothing; and
a means for conveying a visual image attached to the means for clothing, wherein
the means for conveying a visual image includes, with respect to horizontal location, sections of ink separated by sections of flock fibre.

10. The apparatus of claim 9, wherein:
the means for conveying a visual image is adhesively attached to the means for clothing.

11. An apparatus, comprising:
a means for clothing; and
a means for conveying a visual image attached to the means for clothing, wherein
the means for conveying a visual image includes stacks of ink and an insert located between the stacks of ink.

12. The apparatus of claim 11, wherein:
the insert is at least one of foil, flock, textile, film or hologram.

13. The apparatus of claim 11, wherein:
the means for conveying a visual image includes, with respect to horizontal location, sections of ink separated by sections of flock fibre.

14. An apparatus, comprising:
a fabric; and
an article adhered to the fabric, wherein
the article provides a three-dimensional visual effect while adhered to the fabric,
the article includes at least one ink layer, which provides at least in part the three-dimensional visual effect,
the article is at least one of a decorative patch or badge,
the fabric, when laid flat, has a first surface that is flat and one or more second surface(s) that parallel the first surface, the first surface being on a side of the fabric away from the article, and the second surface(s) being on a same side of the fabric as the article, and
the second surface(s) correspond to at least an area that is eclipsed by the article when the apparatus is viewed from an article side of the apparatus looking towards the fabric.

15. The apparatus of claim 14, wherein:
in a state where the fabric is laid flat, a majority of the ink layer(s) of the at least one ink layer are in a same plane and parallel to one another; and
the article includes ink blended with additives that give varying heights to the article.

16. The apparatus of claim 14, wherein:
in a state where the fabric is laid flat, surface(s) establishing a face of the article facing away from the fabric extend(s) in one or more planes, wherein if there is more than one plane, the planes all extend parallel to one another; and
the article includes a PU ink raised in a screen-printed pattern to provide at least in part the three-dimensional visual effect.

17. The apparatus of claim 14, wherein:
a majority of the ink layer(s) of the at least one ink layer are parallel to respective surface(s) of the fabric below the ink layer(s), the respective surface(s) of the fabric being on a side of the fabric opposite the article; and
the article includes, when viewed looking at the article so that the ink of the ink layer(s) can be seen, a first ink containing section and a second ink containing section discrete from the first section, the second section having additive particles not present in the first section, the first and second sections provide at least in part the three-dimensional visual effect.

18. The apparatus of claim 14, wherein:
the article includes inks printed onto the article that have varying thickness that provide at least in part the three-dimensional visual effect; and
the article is an appliqué adhesively adhered to the fabric, the appliqué including at least four layers stacked one on top of the other, the adhesive being one of the at least four layers.

19. The apparatus of claim 1, wherein:
the insignia is an appliqué adhesively adhered to the fabric, the appliqué including at least four layers stacked one on top of the other, the adhesive being one of the at least four layers.

* * * * *